(12) United States Patent
Miller

(10) Patent No.: US 8,717,692 B2
(45) Date of Patent: May 6, 2014

(54) OPTICAL SWITCHING SYSTEM

(75) Inventor: Kirk A. Miller, Dallas, TX (US)

(73) Assignee: Raytheon Company, Waltham, MA (US)

( * ) Notice: Subject to any disclaimer, the term of this patent is extended or adjusted under 35 U.S.C. 154(b) by 196 days.

(21) Appl. No.: 13/340,952

(22) Filed: Dec. 30, 2011

(65) Prior Publication Data
US 2013/0170054 A1    Jul. 4, 2013

(51) Int. Cl.
*G02B 7/02* (2006.01)
(52) U.S. Cl.
USPC .......................................................... 359/821
(58) Field of Classification Search
USPC .......................................................... 359/821
See application file for complete search history.

(56) References Cited

U.S. PATENT DOCUMENTS

| 5,528,416 A | 6/1996 | Hartmann |
| 6,020,994 A | 2/2000 | Cook |
| 2007/0086087 A1* | 4/2007 | Dent et al. ..................... 359/399 |

* cited by examiner

*Primary Examiner* — James Jones
(74) *Attorney, Agent, or Firm* — Lando & Anastasi, LLP

(57) ABSTRACT

An optical switching system and method of selecting between one of several available in optic modules in an optical system is disclosed. In one example, the optical switching system comprises a focus cell assembly disposed in a plane, a rotatable field of view optic system having an axis, configured to rotate around the axis, the axis disposed in parallel to the plane of the focus cell, and a cam device mounted to the field of view optic system and configured to push the focus cell assembly away from the field of view optic system with each rotation of the field of view optic system.

17 Claims, 14 Drawing Sheets

OPTICAL SWITCHING SYSTEM

FEDERALLY SPONSORED RESEARCH

This invention was made with government support under Government Contract Number 2010-0992008-000awarded by Department of Defense. The U.S. government has certain rights in this invention.

BACKGROUND

Modern tactical aircraft use a number of imaging aids to assist the crew in viewing a scene, selecting targets in the scene, and directing weapons against the selected targets. Visible, infrared, and/or specific spectral bands imaging devices are used in various applications to form an image of the scene. The type imaging spectrum depends upon the mission, weather conditions, the nature of the scene, as well as other factors.

The field of view of an imaging device, used to form the image of the scene, describes the range of the captured scene. A wide field of view allows the imaging device to capture a large area of the scene. In turn, a smaller field of view captures less of the scene, allowing the image device to "focus in" on the image, and may further help to discern small features within the image.

Multi-spectral targeting systems may use both infrared and visible light imaging sensors and may include multiple different optical systems suited for use with each type of sensor. For example, optical system used with an infrared image sensor may not be suitable for use with a visible light image sensor. Additional optical systems may be included in the multi-spectral targeting systems for capturing images with different fields of view. Further, it may be desirable to quickly switch between different optical systems. For example, the multi-spectrum targeting system may capture multiple images of the same scene using different field of view optics and/or optics optimized for different spectral bands.

SUMMARY

As described above, switching between different optical systems with different field of view or those optimized for different spectral bands may be needed in multi-spectral targeting systems. Conventional switching optics systems include one or more optical lenses, a focus lens, a mechanism for moving different lenses included in the optical system, and a control system, with control software, for directing the mechanism to move one or more of the optical lenses into the optical path of the focus lens. For example, the control system may direct the focus lens to move away from the optical lenses, creating clearance for one of the optical lenses to move into position. The control system may then direct one of the optical lenses to switch into position aligning with the focus lens. As the optical lens moves into position, the control system directs the focus lens to move back to complete the optical path. Because the control system coordinates the timing of each of the movements, there is an overall reaction time associated with the system. In other words, there may be a delay between receiving a command to switch and the completed the switch from one position to another. The longer it takes for the lenses to move between positions, the longer the overall reaction time. Because of coordinated movement the reaction time in conventional systems makes them unsuited for use in multi-spectral targeting systems. In addition, in conventional systems, if the command from the control system is not properly timed, there is potential for damaging either the focus lenses or the optical lenses during the coordinated movement.

Therefore, aspects and embodiments are directed to a rotating optical switching system that allows for fast switching between optics without coordinating with a control system and without additional complexity. According to one embodiment, the optical switching system comprises a rotating cam device coupled to a field of view optic system and is configured to push a focus cell assembly away from the field of view optic system. The rotating cam device presents an effective solution that reduces the complexity of the switching system, by decreasing the number of mechanical parts needed to switch between different field of view optics. The optical switching assembly, as further described below, reduces the optical system switching time and further, diminishes the likelihood of damaging the optics from manual manipulation of system. In addition, the cam device allows for automatic switching of the field optics without the need to train assemblers or test technicians on the proper manual operation of the optical switching assembly, as discussed further below.

According to one embodiment, an optical switching system comprises a focus cell assembly disposed in a plane, a rotatable field of view optic system having an axis, configured to rotate around the axis, the axis disposed in parallel to the plane of the focus cell, and a cam device mounted to the field of view optic system and configured to push the focus cell assembly away from the field of view optic system with each rotation of the field of view optic system.

In one example, the cam device has a truncated circle shape including a plurality of truncations and the plurality of truncations define an optical prescription of the optical switching system. In addition, the field of view optic system may include a plurality of sides and further includes a plurality of optics disposed on the plurality of sides.

In one example, the plurality of optics may include a first lens cell, a second lens cell, a third lens cell, and a fourth lens cell and the plurality of sides may include four sides. In this example, the first lens cell, the second lens cell, the third lens cell and the fourth lens cell are disposed on each of the four sides of the field of view optic system, respectively. In another example, the cam device includes a plurality of un-truncated portions and the plurality of un-truncated portions push the focus cell assembly away from the field of view optic system during each rotation.

In another example, the optical switching system further comprises a gear system in contact with the cam device and configured to rotate the field of view optic system. In addition, the optical switching system may further comprise a focus lead screw coupled to the focus cell assembly and configured to return the focus cell assembly toward the field of view optic system after each rotation. In this example, the focus lead screw further includes a helical coil spring wrapped around the length of the focus lead screw.

In another example, the optical switching system further comprising a focus lead screw nut coupled to the focus lead screw and configured to adjust a distance between the focus cell assembly and the field of view optic system. In addition, optical switching system may further comprise at least two cam followers coupled to the focus cell assembly, configured to roll along the cam device. In this example, the cam followers are configured to prevent the field of view optic system from colliding with the focus cell assembly. In one example, optical switching system further comprises at least one cam stop disposed on the cam device configured to stop the cam device from rotating.

According to another embodiment, a method of selecting between one of several available in optic modules in an optical system, the optical system includes a field of view optic system, disposed around an axis, a cam device coupled to the field of view optic system and a focus cell assembly disposed perpendicular to the axis. The method comprises rotating the field of view optic system around the axis, pushing the focus cell assembly away from the field of view optic system during each rotation of the field of view optic system, and switching between a plurality of optical states, each rotation corresponding to one of the optical states.

In one example, the field of view optic system further comprises a plurality of lens cells and switching between the plurality of optical states further comprises aligning one of the plurality of lens cells to the focus cell at each rotation. In another example, the plurality of optical states include a first optical state, a second optical state and a third optical state, and rotating the field of view optic system further comprises rotating the field of view optic system from the first optical state, to the second optical state, to the third optical state.

In one example, the method further comprises compressing a helical coil spring as a result of the focus cell assembly being pushed away from the field of view optic system, during each rotation of the field of view optic system. In this example, the optical system further comprises a focus lead screw having a length, and the method further comprises returning the focus cell assembly toward the field of view optic system by releasing the helical coil spring. In this example, the optical system further comprises a focus lead screw nut coupled to the focus lead screw and the method further comprises adjusting a distance between the focus cell assembly and the field of view optic system by moving the focus lead screw nut along the length of the focus lead screw.

In one example, the optical system further comprises a gear system in contact with the cam device, and rotating the field of view optic system around the axis further comprises rotating the field of view optic system by rotating the gear system.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
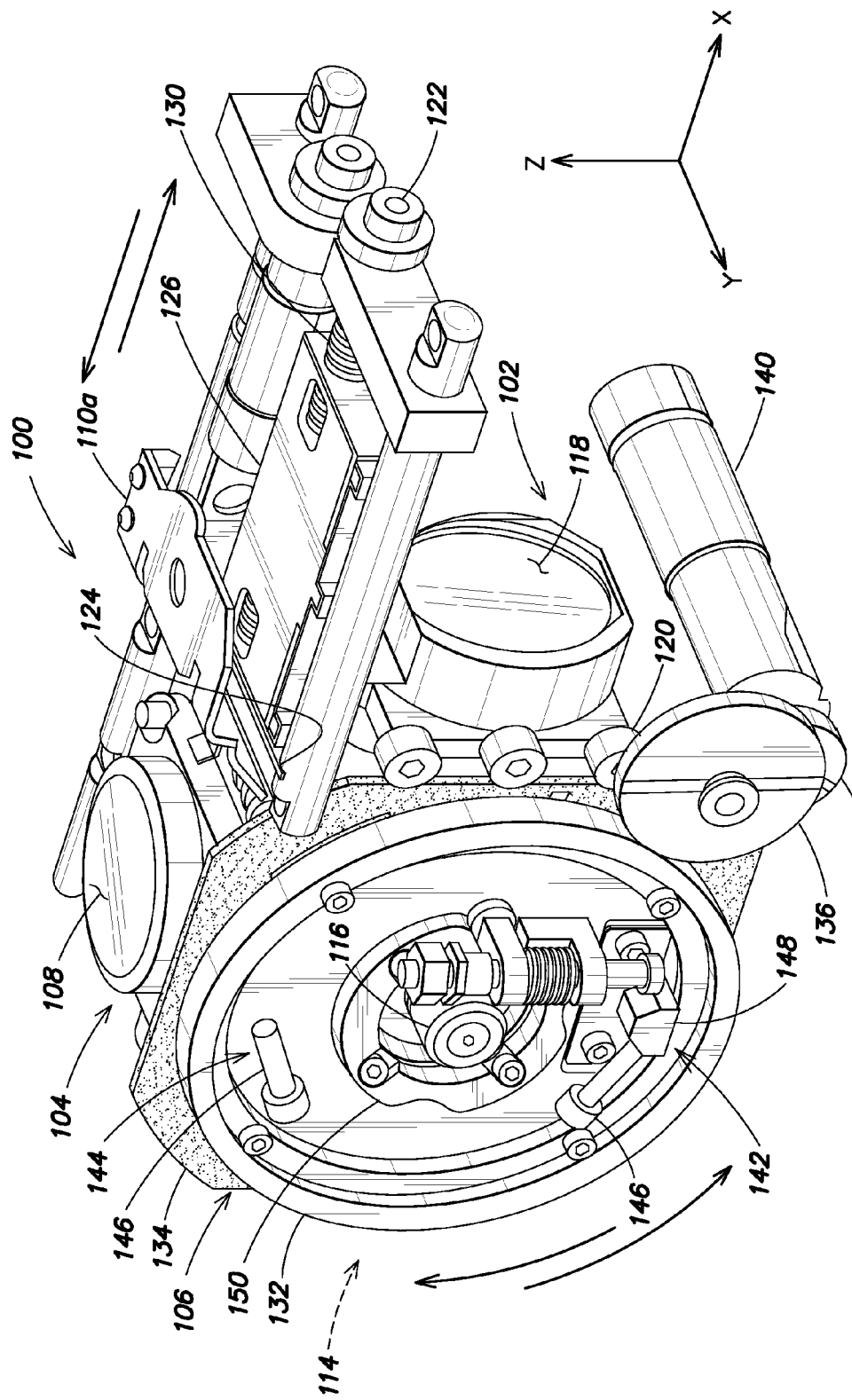
FIG. 1 is an isometric view diagram of one example of an optical switching system rotated in one position, including a focus cell assembly in a forward location, according to aspects of the present invention.

As discussed above, a delay in switching of optical lenses is undesirable because it decreases the overall reaction time of the optical system. In one example, conventional optical switching systems may deliver an overall switching time of about one second. However, in several applications, a faster switching time may be desirable; for example, in targeting systems a switching time of 0.5 seconds is desired. Therefore, there is a need for a system and method of switching field of view optics that significantly reduces the switching time without increasing the potential for damaging the optical lenses. Aspects and embodiments are directed to an optical switching system that overcomes the switching time issues discussed above, and provides a switching mechanism without increasing overall system complexity. The optical switching system is described below in reference with use in a multi-spectral targeting system that switches between different field of view optical lenses. However, the optical switching mechanism may be used in any imaging device where switching between any type of optical lenses in an optical system is desired.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1, there is illustrated an example of an optical switching system according to one embodiment. The system 100 includes a focus cell assembly 102, a rotatable field of view optic system 104 and a cam device 106. The optical switching system 100 may be disposed in an imaging device that includes a frame for supporting the system 100. In at least one example, the imaging device may be a multi-spectral targeting system the optical switching system can be used in other imaging devices that include multiple optical systems optimized for different field of view or for different spectral bands. In addition, although the rotating optic system is designated as a field of view optical system, it is appreciated that the rotating optic system may be another type of optical system, for example one that is optimized for different spectral bands.

In one embodiment, the field of view optic system 104 has a cube shape, and includes four rotational sides with an optical lens disposed on each of the four sides. In other embodiments, the field of view optic system 104 may include a different number of optical lenses. In another embodiment, the field of view optic system 104 may have a spherical or elliptical shape and may include more than four optical lenses disposed around a circumference of the optic system. It is appreciated that some of the optical lenses are not visible in the rotation of the field of view optic system 104 shown in FIG. 1. For example, as shown in FIG. 1, optical lens 108 is pointed upward along Z-axis. In other rotations of the field of view optic system 104, shown in FIGS. 2-9, other optical lenses become visible as they are rotated into view. It is also to be appreciated that embodiments of the system may include optical lenses that are not visible in the views illustrated in FIGS. 1-9.

In one example, the field of view optic system 104 includes a shaft 116 which extends through the two sides of the field of view optic system 104, side one and side two. Side one is in the line of sight of the viewer, while side two is disposed opposite side one and not visible to the viewer. As shown in FIG. 1, the shaft 116 is located along the Y-axis. The field of view optic system 104 is rotated around the shaft 116 by a motor as further described below.

The focus cell assembly 102 includes a focus cell 118 having one or more focus lenses, cam followers 120, a lead screw 122 and a lead screw nut 124. As each of the lenses rotates into position, the focus cell 118 aligns parallel to the respective field of view optical lens, forming an optical path. The cam device 106 is disposed on side 1 of the field of optic system around the perimeter and includes a ring gear 132 and a cam 134. The ring gear 132 is approximately the size of the field of view optic system 104 and includes a flat edge along the perimeter of the ring gear. The cam 134 has a truncated circular shape. The size of each truncation relates to the offset or the distance between the focus cell assembly 102 and the respective field of view optical lens needed to form an optical path. Different truncations may be selected for different offsets, varying the optical prescription of the system.

The cam followers 120 include one or more wheels configured to rotate in response to force applied to each of the wheels by the cam device 106. As the field of view optic system 104 rotates, the cam followers 120 roll along the flat edge of the cam device 106. The corners of the cam device 106 exert force on the cam followers 120 of the focus cell assembly 102. As the result the focus cell assembly 102 is pushed away from the field of view optics 104 along the X-axis. The size of the cam 134 is such that it allows the focus cell assembly 102 to move to a distance sufficient to create clearance for the field of view optics 104 to rotate to the next position without making contact with the polished optical surfaces of focus cell 118 or one of the optical lenses of the field of view optics 104. After completion of a revolution, the focus cell assembly 102 moves back into position proximate to the field of view optics 104.

The focus cell assembly 102 includes a panel 126 integral to the focus cell 118. The panel 126 is disposed perpendicular to the focus cell 118 along the X-axis and is configured to move in the direction indicated by the arrows. The lead screw 122 disposed through a clearance hole along the length of the panel 126 and may be extended through an opening (shown in FIG. 2) of the lead screw nut 124. The lead screw nut 124 is coupled to the lead screw 122. A compression spring 130 is disposed around the length of the lead screw 122 inside the panel 126. As the panel 126 moves back and forth the compression spring 130 around the lead screw 122 is either compressed or released. The compression spring 130 is preloaded to be pushing against the lead screw nut 124. As the cam device 106 rotates, it exerts force on the focus cell assembly 102 and the compression spring 130 compresses as the focus cell assembly 102 is pushed away from the field of view optical system 104. As the cam device completes part of the rotation, the compression spring 130 is released and the focus cell assembly 102 springs back toward the field of view optics 104, pushing against the lead screw nut 124.

The lead screw 122, together with the lead screw nut 124, may be used to adjust the position of the focus cell assembly 102 with respect to the field of view optic system 104 by moving the lead screw nut 124 along the lead screw 122 along the X-axis, bringing the focus cell assembly 102 closer or farther away from the field of view optics 104. When the compression spring is released, the lead screw nut 124 makes contact with the panel 126 as it moves back along the X-axis and prevents the panel 126 from moving any closer to the field of view optics system 104. The further the lead screw nut 124 is moved from the field of view optic system 104, the further away the focus cell 118 is positioned from the field of view optics 104.

In addition, the field of view optic system 104 includes one or more cam stops. Cams stops 142 and 144 are comprised of a stationary portion 146 and a rotational portion 148. The rotational portion 148 is disposed on the ring gear 132 of the cam device 106 and rotates along with the cam device 106, while the stationary portion 146 is disposed on the frame of the imaging device. As the rotational portion 148 collides with the stationary portion 146 the cam stops 142 and 144 prevent the field of view optic system 104 from rotating any further in that particular direction. Intermediary cam stop 150 includes a cam, having one or more grooves, that is disposed on an inner diameter of the cam device 106 and a spring loaded cam follower coupled to the frame of the imaging device. The intermediary cam stop 150 provides one or more detent stops between the stops provided by cam stops 142 and 144.

The optical switching system 100 may include an idler gear 136, a hysteresis gear 138 and a micro-drive system 140 which may include a DC motor and a controller. The micro-drive system 140 rotates the hysteresis gear 138, which rotates the idler gear 136. The idler gear 136 makes contact with the cam device 106 and rotates the field of view optic system 104. The controller may adjust the speed of the micro-drive system 140. The speed of the micro-drive system 140 may be adjusted to allow maximum switching time while minimizing stress on the system when the cam stops collide. In one example, the DC motor includes a 12 millimeter motor with 64:1 gear ratio gear head and an integral encoder, such as a micro-motor manufactured by MICROMO, a member of the FAULHABER GROUP.

The field of view optic system 104 rotates through various positions, each position corresponding to alignment of one of the optical lenses with the focus cell 118. In one example, the optical switching system 100 may include an "off" position, where the field of optic system 104 rotates into a position without aligning one of the optical lenses with the focus cell 118. The optical switching system shown in the figures below illustrates a first, second and third position. In the first position, optical lens 110 aligns with the focus cell 118. In the second position optical lens 112 aligns with the focus cell 118. And in the third position optical lens 114 aligns with the focus cell 118. The different positions in the rotation are shown for purposes of example only and it is appreciated that the optical switching system can rotate through different positions and in different order, achieving any number of orientations.

The cam stops 142, 144, and 150 may be disposed to limit the range of rotation of the field of view optic system 104 and allow the field of view optic system 104 to stop at the different positions, which may be selected by the operator of the optical switching system 100. The cam stops 142, 144 and 150 may be adjustable to allow the field of view optics to stop at any point in the rotation of the optic system. For example, cam stops 142 allows the field of view optic to stop at the first position, cam stop 144 allows the field of view optic to stop at the third position and intermediary cam stop 150 allows the field of view optic to stop at the second position.

Examples of operation of embodiments of the optical switching system of FIG. 1 will be discussed below with continuing reference to FIG. 2 through FIG. 14. FIGS. 2-9 illustrate the rotation of the field of view optic system 104, with the focus cell assembly 102 in the extreme forward position, and FIGS. 10-14 illustrate the rotation of the field of optic system 104, with the focus cell assembly 102 in the nominal position. The field of view optic system 104 rotates through various positions of the optical switching system 100 and may stop at any of the positions in the rotation.

The field of view optic system 104 shown in FIG. 1 is in the first position, with the optical lens 108 facing upward in the direction of the Z-axis. An aperture stop 110a for the optical lens 110 is resting over the panel 126 of the focus cell assembly 102, while the optical lens 110 is aligned with the focus cell 118 forming an optical path. From the first position, the field of view optic system 104 rotates counterclockwise around the shaft 116 to the second position shown in FIG. 3.

Figure 2:
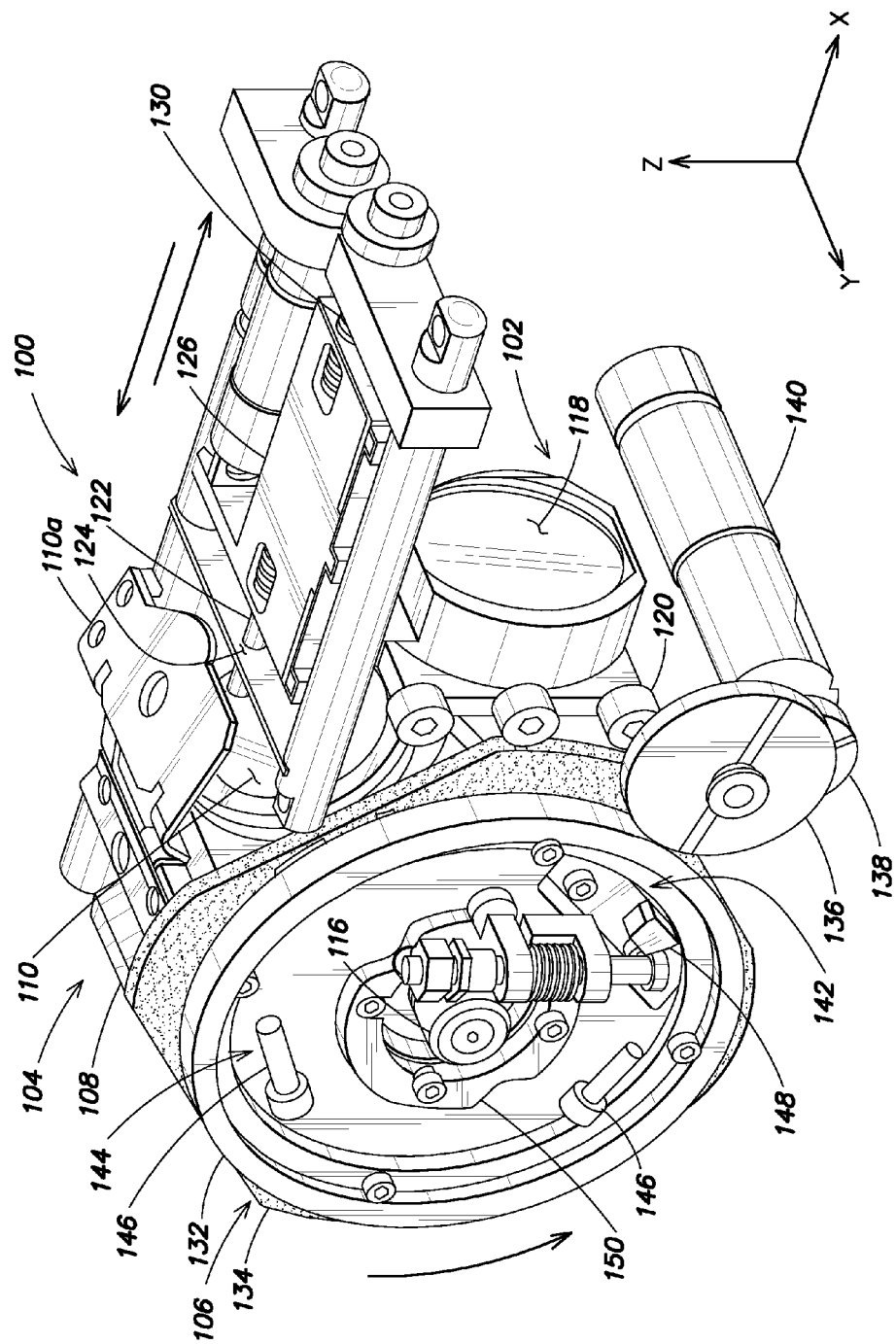
FIG. 2 is an isometric view diagram of one example of an optical switching system in between positions, according to aspects of the present invention.
Figure 3:
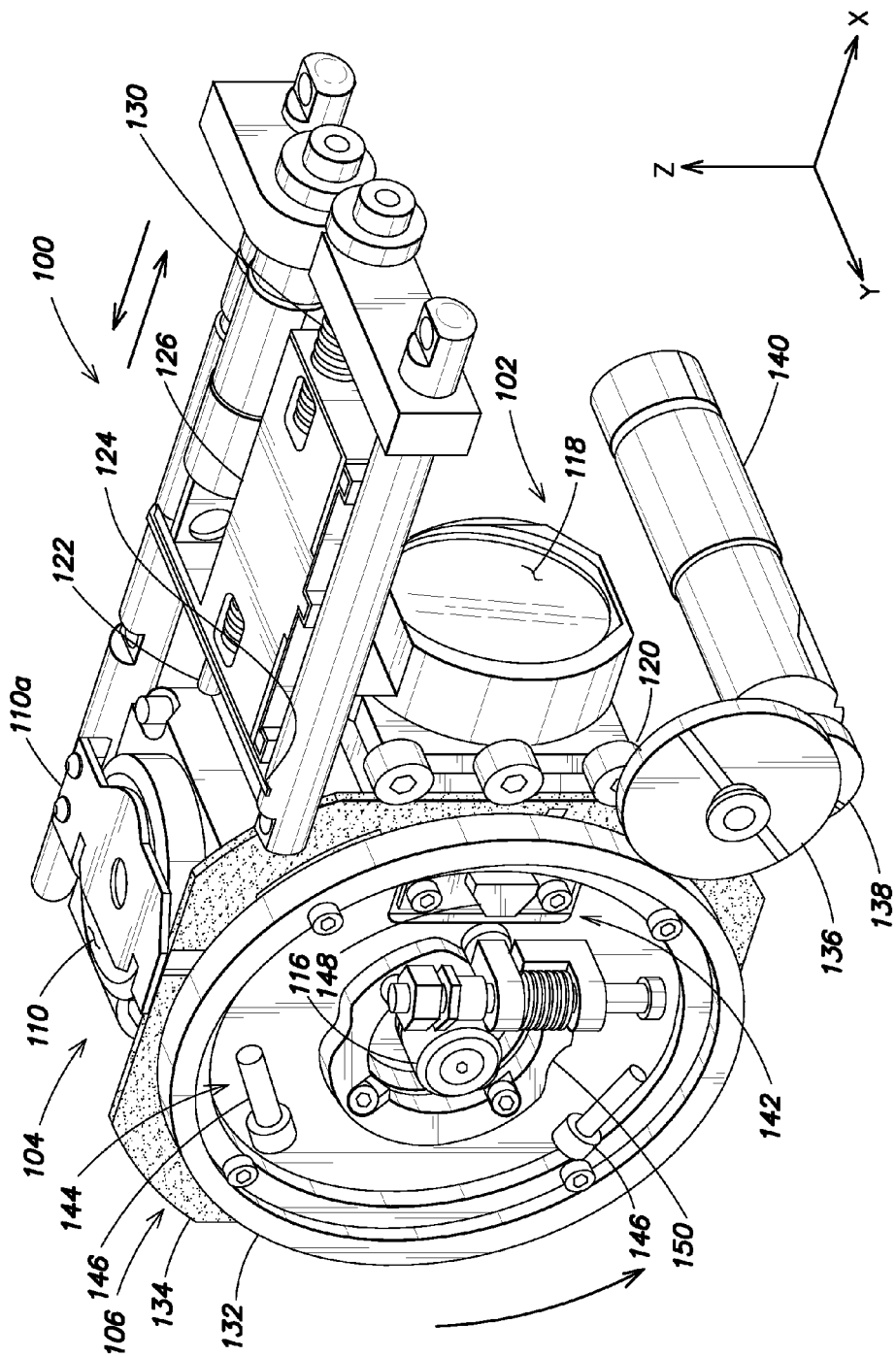
FIG. 3 is an isometric view diagram of one example of an optical switching system in another position, according to aspects of the present invention.

FIG. 2 shows the position of the field of view optic system 104 between the first and second positions. One of the corners of the cam 134 makes contact with the cam followers 120 pushing them away from optical lens 112. During the rotation, as the cam followers 120 traverse the corner of the cam 134, the compression spring around the lead screw 122 compresses due to the force exerted by the cam 134. The cam followers 120 continue to move along the edge of the cam 134 following the shape of the cam 134. As the cam followers 120 follow the cam 134 around the corner to the flat side of the cam 134, the compression spring 130 is released and the focus cell assembly 102 is returned toward the field of view optics 104. The field of view optics system 104 moves from first position toward the second position shown in FIG. 3. The aperture stop 110a may include a torsion spring at a pivot axis of the aperture stop 110a. During the rotation from first to second position, the aperture stop 110a the torsion spring lifts from the panel 126 and returns to be placed over the optical lens 110. During the rotation the edge of the aperture stop 110a may ride along a cam profile disposed on the frame of the image device.

In one embodiment, the field of view optics 104 may rotate from the first position to the second position and come to a stop at the second position by using the intermediary cam stop 150. Alternatively, the optical switching system 100 may move from the first position, past the second position, to making contact with cam stop 144, stopping in the third position.

In the second position, optical lens 112 aligns with the focus cell 118 forming an optical path. Optical lens 110 with the aperture stop 110a resting over it is facing upward in the direction of the Z-axis. From the second position, the field of view optic system 104 rotates counterclockwise around the shaft 116 toward the third position shown in FIG. 5.

Figure 4:
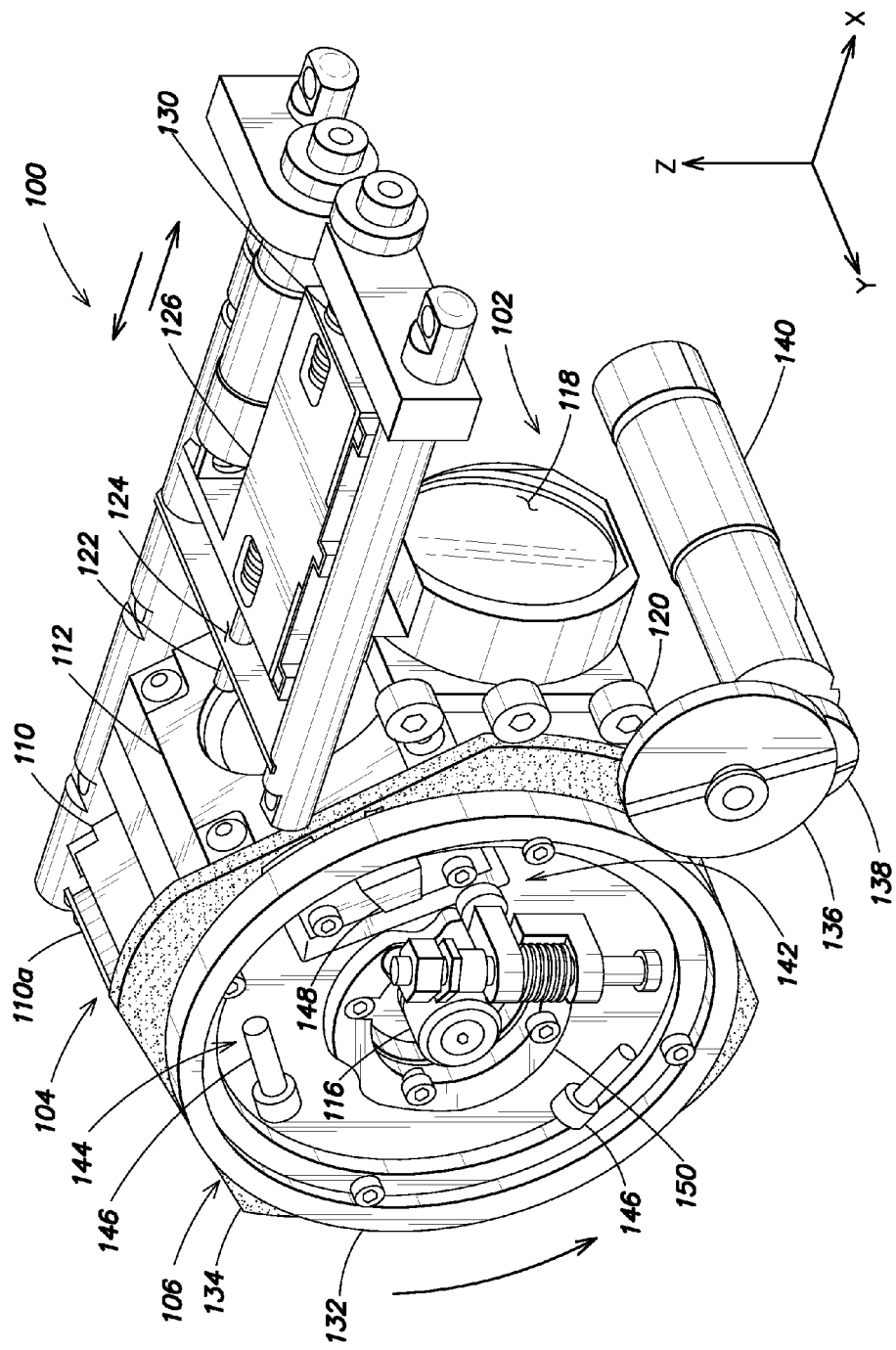
FIG. 4 is an isometric view diagram of one example of an optical switching system between positions, according to aspects of the present invention.

FIG. 4 shows the position of the field of view optic system 104 between the second and third positions. Similar to the movement described above, the corners of the cam 134 push the focus cell assembly 102 away from optical lens 110. The cam followers 120 traverse the edge of the cam 134, with the cam 134 pushing the focus cell assembly 102 away and compressing the compression spring. As the cam followers 120 come to the side of the cam 134, the compression spring 130 returns the focus cell assembly 102.

Figure 5:
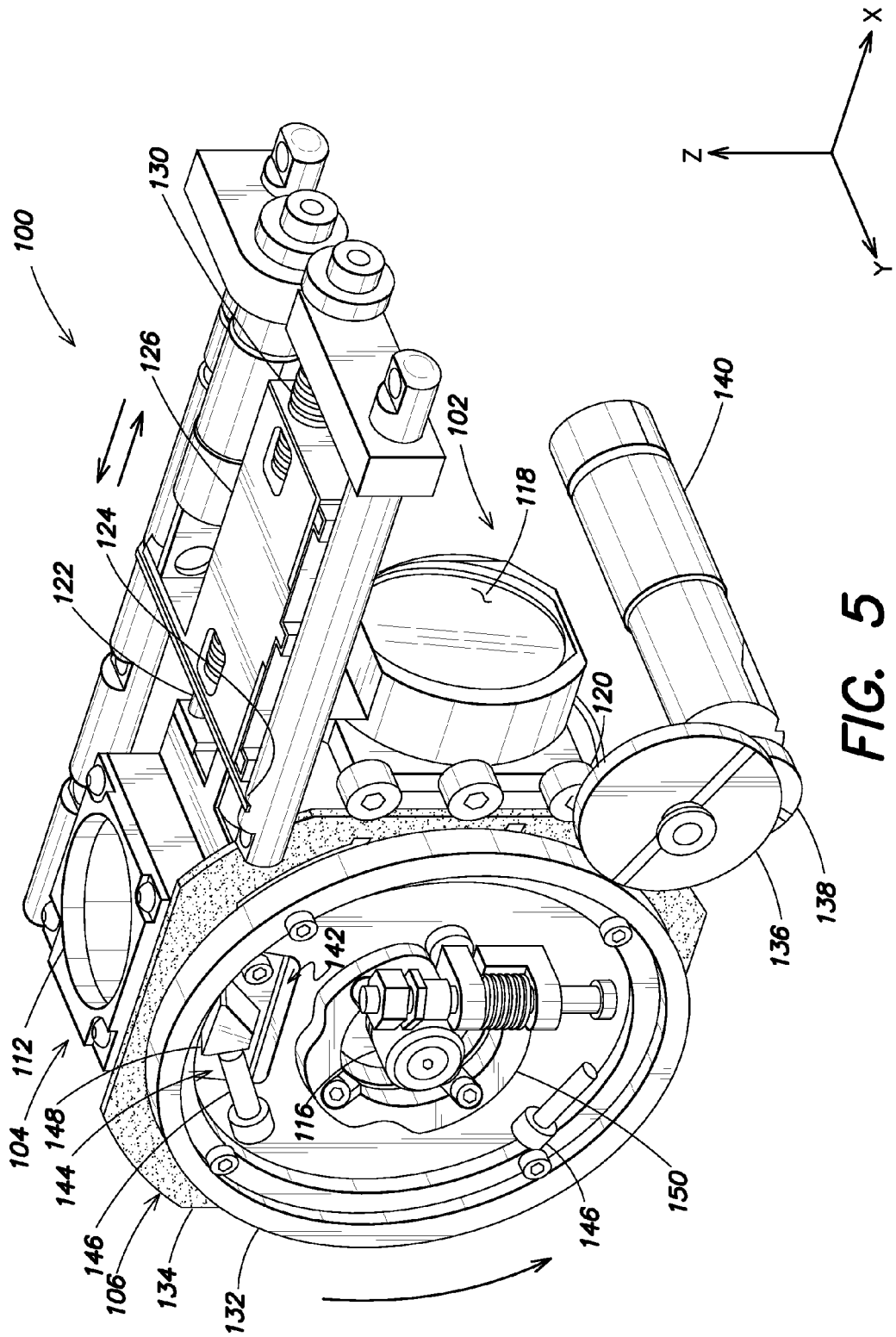
FIG. 5 is an isometric view diagram of one example of an optical switching system in another position, according to aspects of the present invention.

In one embodiment, the field of view optics system 104 moves from the second position toward the third position shown in FIG. 5. In the third position the focus cell 118 aligns with the side of the field of view optics 104 with optical lens 114 (not shown). The optical lens 112 is facing upward in the direction of the Z-axis.

From the third position, the field of view optic system 104 rotates clockwise around the shaft 116 repeating the above described movement. In one embodiment, the field of view optic system 104 moves from the third position toward the second position, stopping at the second position by using the intermediary cam stop 150. Alternatively, the field of view optic system 104 cam 134 move from the third position, past the second position, making contact with cam stop 142, to stop in the first position.

Figure 6:
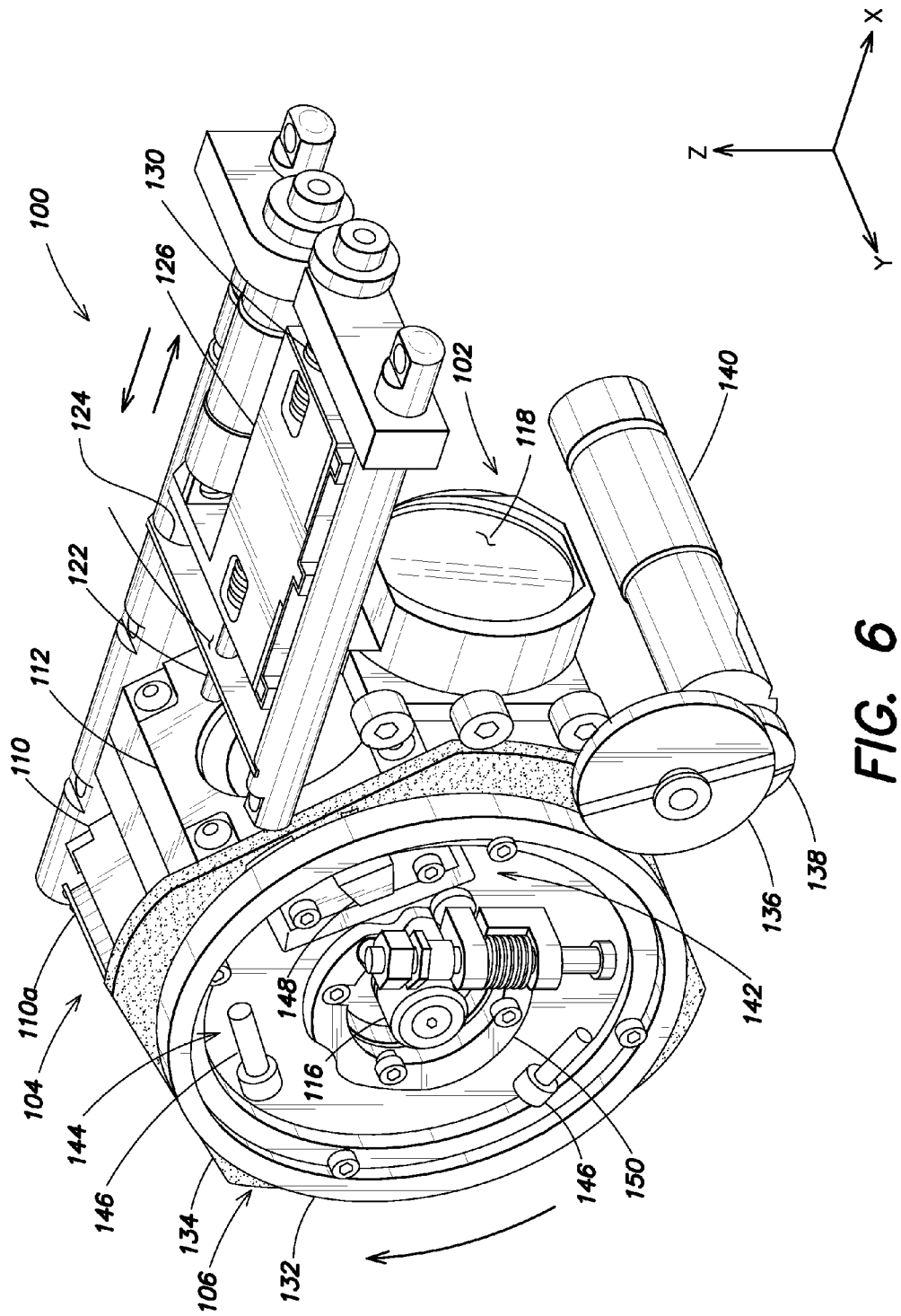
FIG. 6 is an isometric view diagram of one example of an optical switching system between positions, according to aspects of the present invention.
Figure 7:
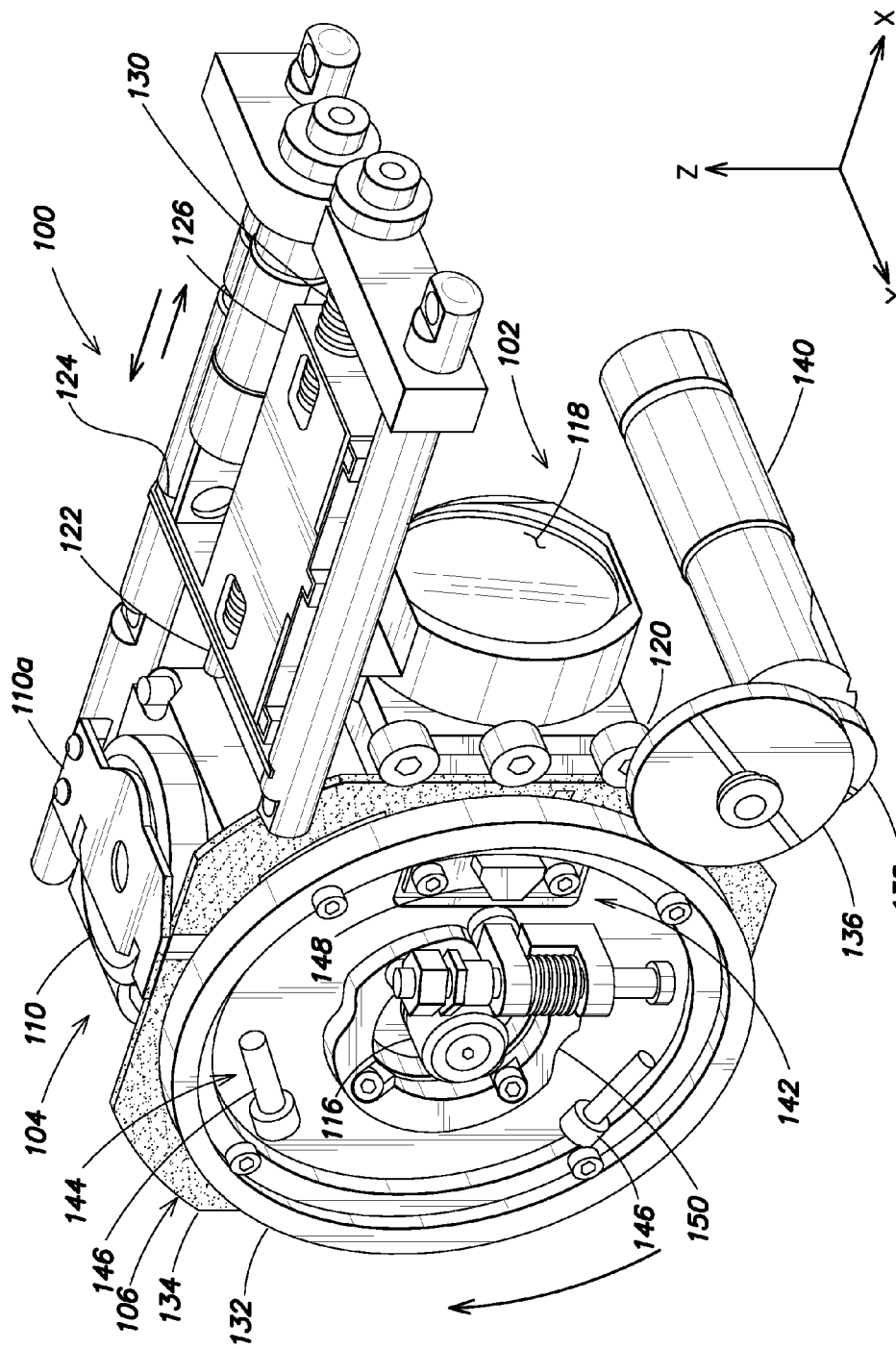
FIG. 7 is an isometric view diagram of one example of an optical switching system in another position, according to aspects of the present invention.

FIG. 6 shows the position of the field of view optic system 104 between the third and second positions. Similar to the movement described above, the corners of the cam 134 push the focus cell assembly 102 away from the optical lens 114. The cam followers 120 traverse the edge of the cam 134, with the cam 134 pushing the focus cell assembly 102 away and compressing the compression spring. As the cam followers 120 come to the side of the cam 134, the compression spring 130 returns the focus cell assembly 102. Field of view optics move from third position to second position shown in FIG. 7. In the second position, optical lens 110 aligns with the focus cell 118 and the optical lens 112 with the aperture stop 110a is facing upward in the direction of the Z-axis.

Figure 8:
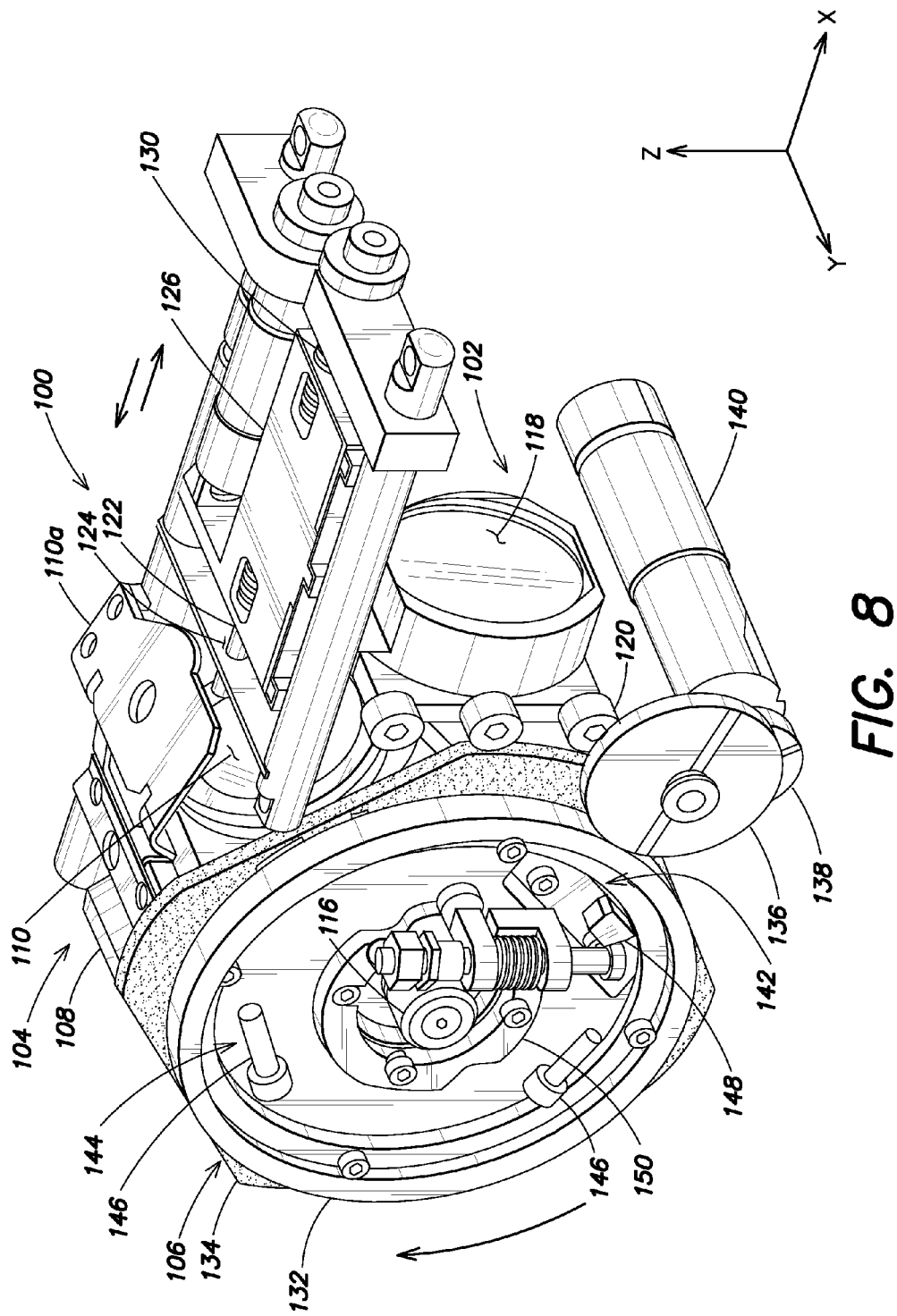
FIG. 8 is an isometric view diagram of one example of an optical switching system between positions, according to aspects of the present invention.
Figure 9:
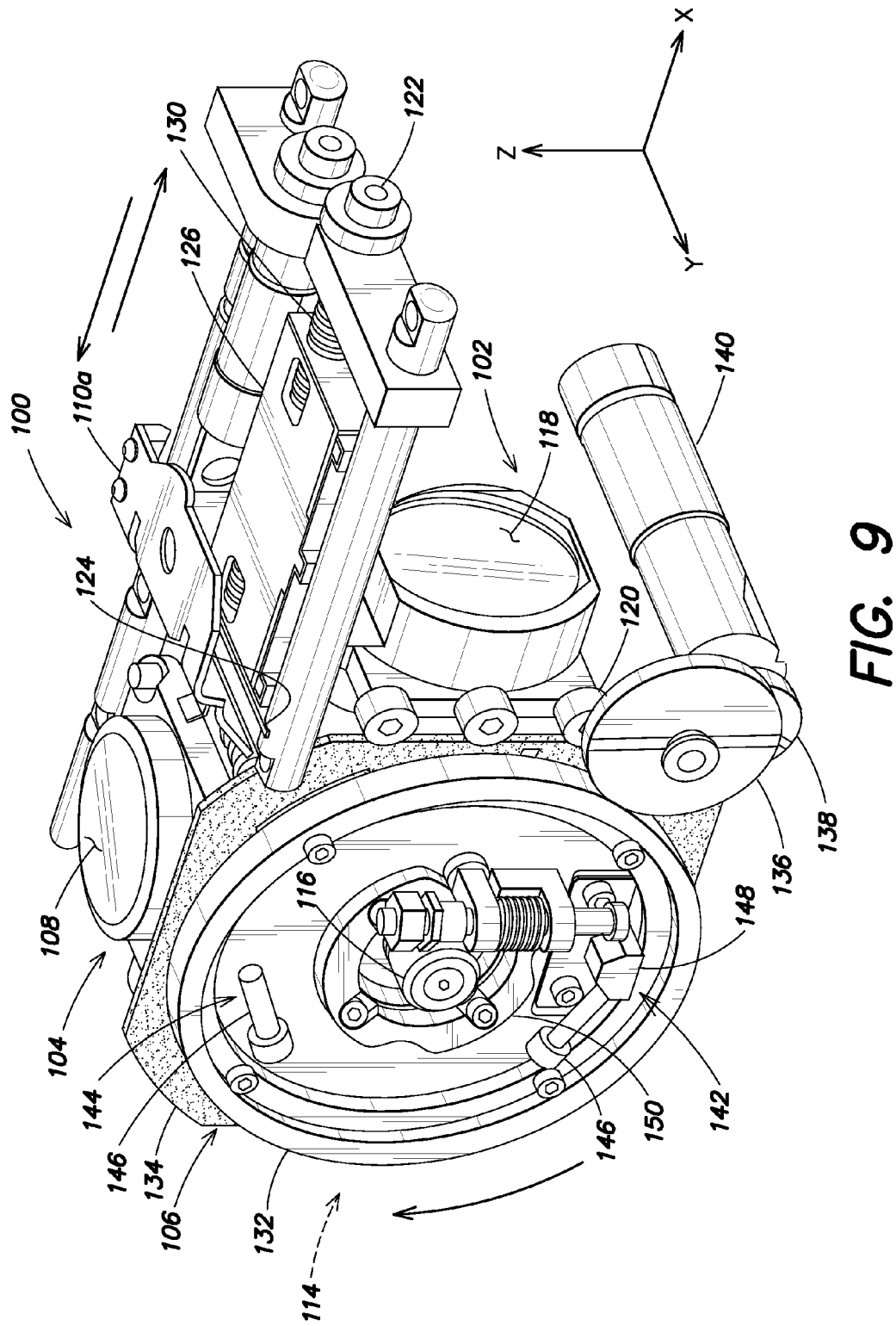
FIG. 9 is an isometric view diagram of one example of an optical switching system in another position, according to aspects of the present invention.

From the second position, the field of view optic system 104 rotates clockwise around the shaft 116 to the first position shown in FIG. 9. FIG. 8 shows the position of the field of view optic system 104 between the second and first positions. The aperture stop 110a rides along the cam profile on the frame of the image device, away from the optical lens 110, and comes to rest over the panel 126, as shown in FIG. 9. The optical lens 108 is now facing upward in the Z-axis.

As described above, FIGS. 1-9 show the focus cell assembly 102 in the extreme forward position, while FIGS. 10-14 show the focus cell assembly 102 in the nominal position. In one embodiment, the extreme forward position is the closest the focus cell assembly 102 may be positioned to the field of view optics 104, while the nominal position is the farthest away the focus cell assembly 102 may be positioned from the field of view optics 104. As described above, the lead screw 122 and the lead screw nut 124 allows for the position of the focus cell assembly 102 to be adjusted in relation to the field of view optics 104. To be placed in the nominal position, the lead screw 122 is moved through the opening of the lead screw nut 124 to position the focus cell assembly 102 further from or closer to the field of view optics 104.

Figure 10:
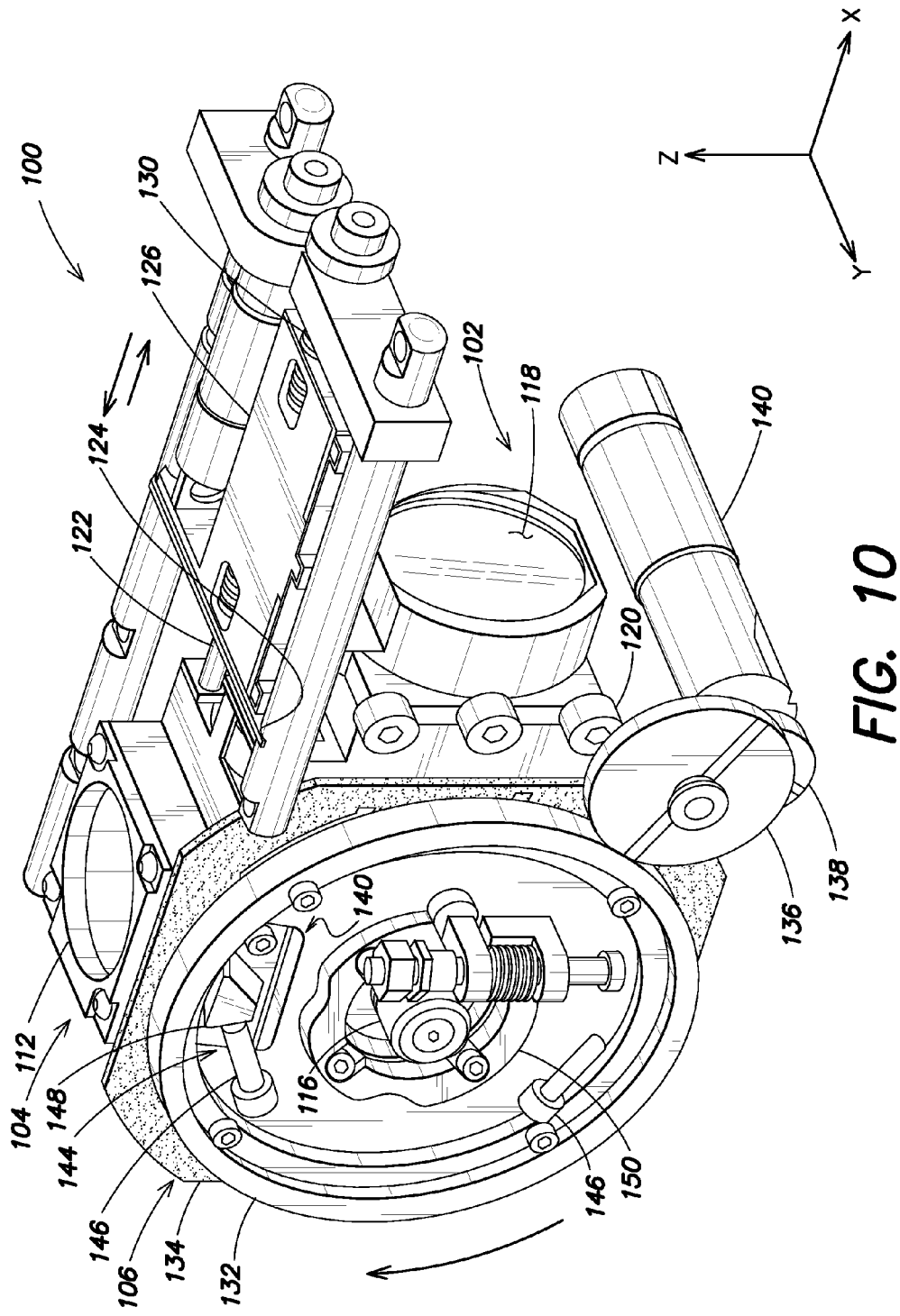
FIG. 10 is an isometric view diagram of one example of an optical switching system rotated in one position including a focus cell assembly in a nominal location, according to aspects of the present invention.

Similar to FIG. 5, FIG. 10 shows the optical switching system 104 in the third position where the focus cell 118 aligns with the optical lens 114. The optical lens 112 is facing upward in the direction of the Z-axis. From the third position, the field of view optic system 104 rotates clockwise around the shaft 116 repeating the above described movement.

Figure 11:
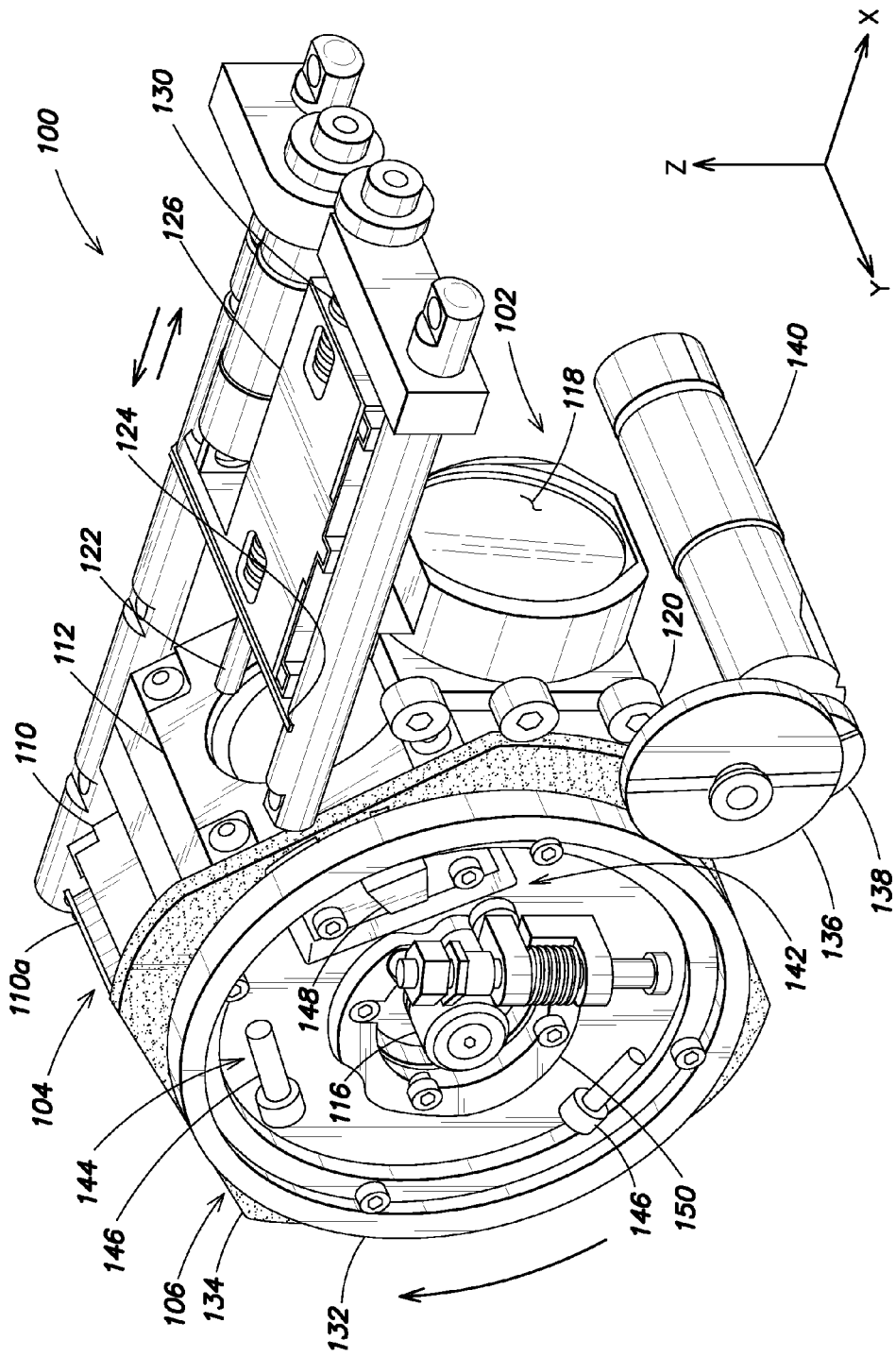
FIG. 11 is an isometric view diagram of one example of an optical switching system in between positions including a focus cell assembly in a nominal location, according to aspects of the present invention.
Figure 12:
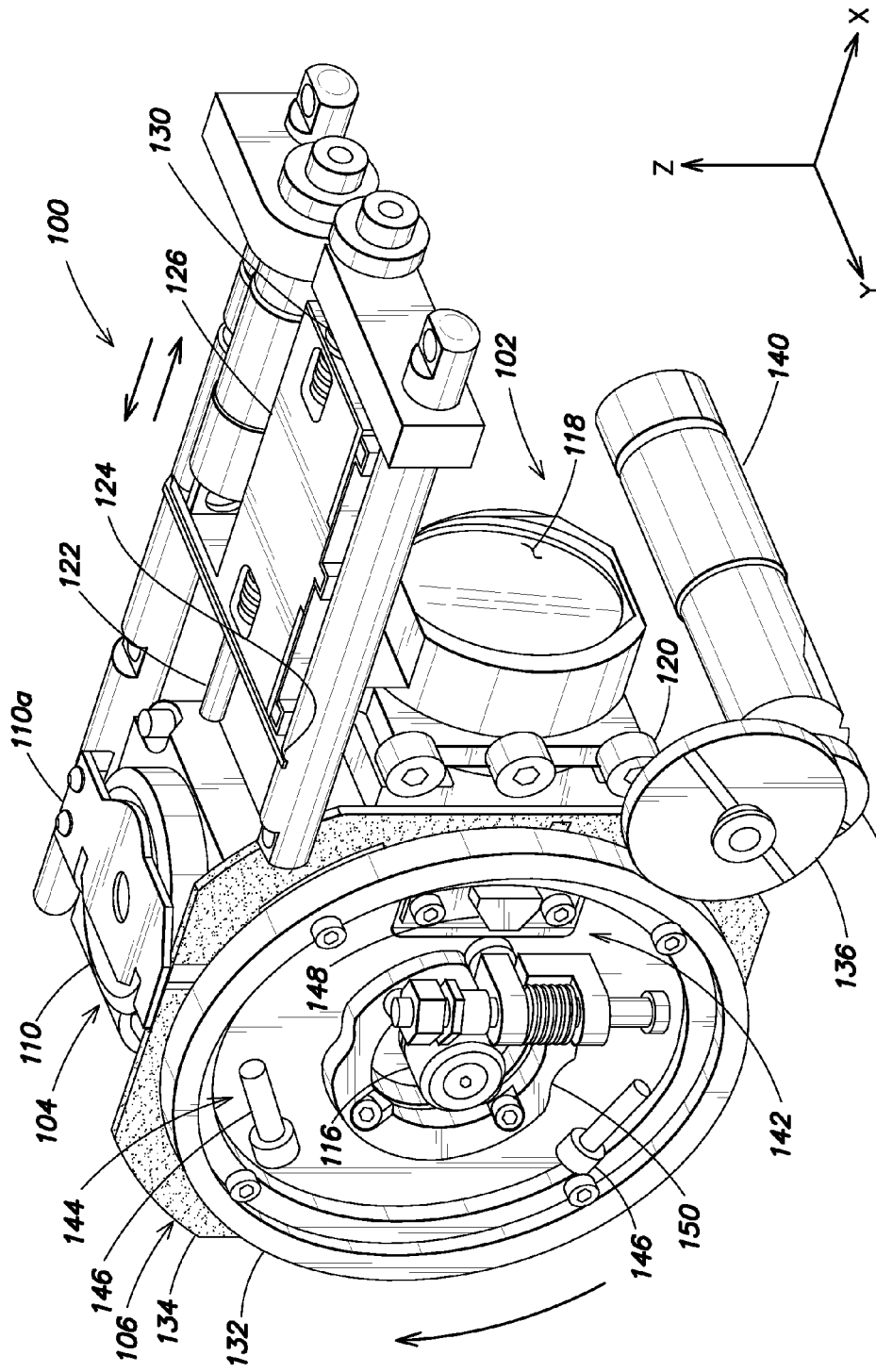
FIG. 12 is an isometric view diagram of one example of an optical switching system rotated in another position including a focus cell assembly in a nominal location, according to aspects of the present invention.
Figure 13:
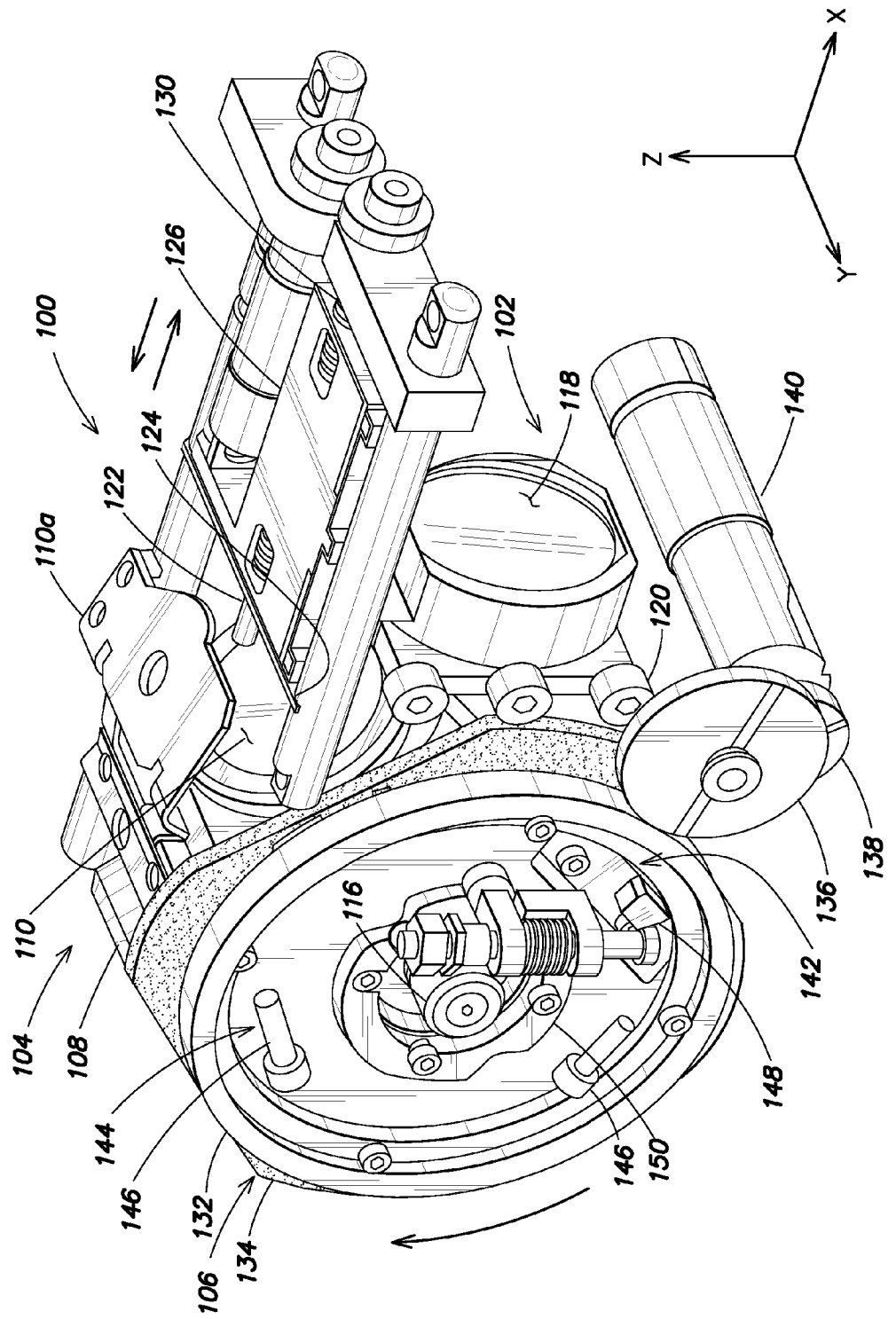
FIG. 13 is an isometric view diagram of one example of an optical switching system in between positions including a focus cell assembly in a nominal location, according to aspects of the present invention.
Figure 14:
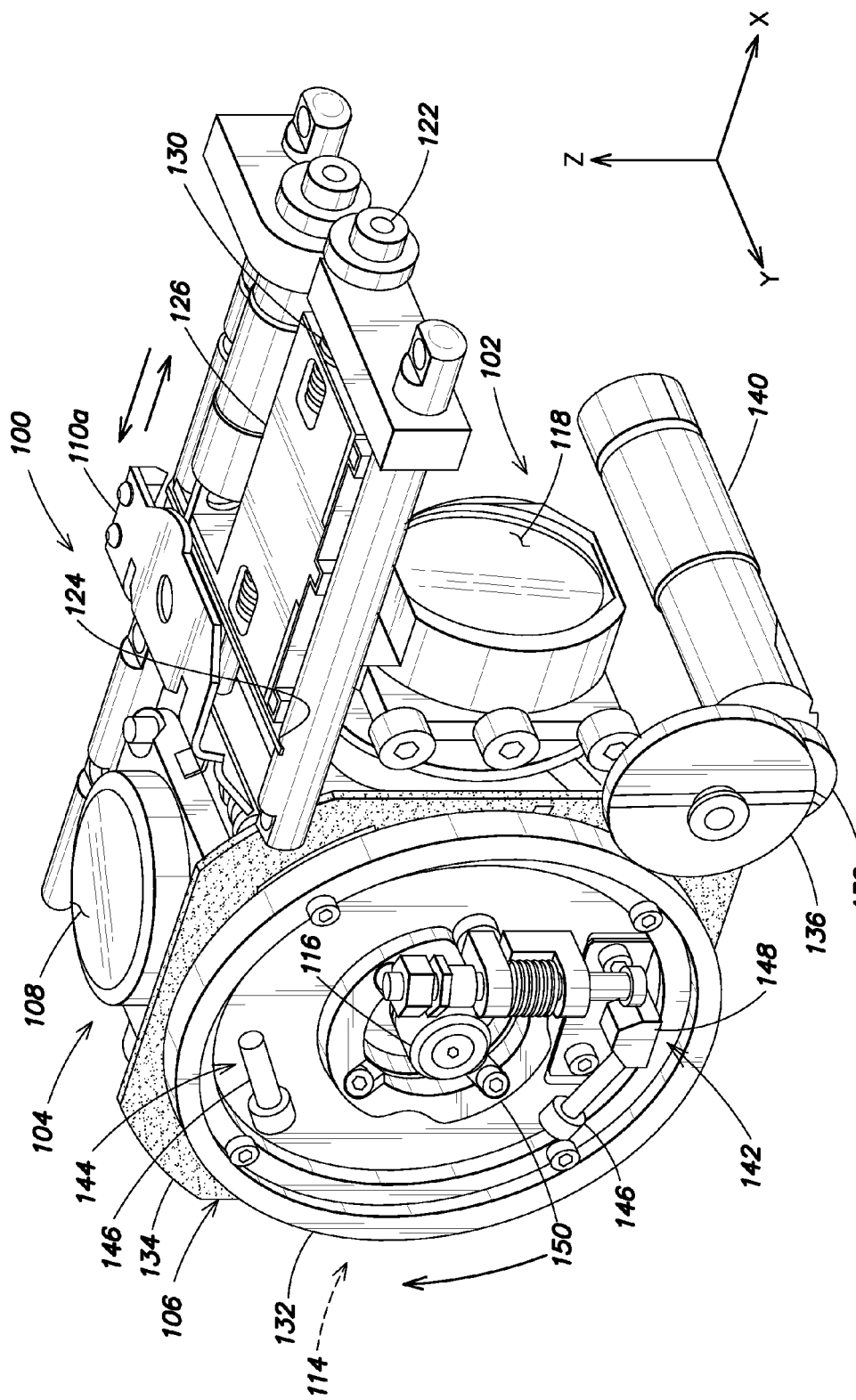
FIG. 14 is an isometric view diagram of one example of an optical switching system rotated in another position including a focus cell assembly in a nominal location, according to aspects of the present invention.

FIG. 11, similar to FIG. 6, shows the position of the field of view optic system 104 between the third and second positions. The cam 134 of the cam device 106 pushes the focus cell 118 away from the field of view optics 104 to create clearance for the field of view optics to complete the revolution. However, in contrast to FIG. 6, the focus cell assembly 102 in the nominal position is not significantly moved from the field of view optics, because the focus cell assembly 102 is already in the forward-most location. Field of view optics 104 then moves from third position to second position shown in FIG. 12, where optical lens 112 aligns with the focus cell 118 and the optical lens 110 with the aperture stop 110a is facing upward in the direction of the Z-axis. From the second position, the field of view optic system 104 rotates clockwise around the shaft 116 to the first position shown in FIG. 14. FIG. 13 shows the position of the field of view optic system 104 between the second and first positions. Similar to the movement above with reference to FIGS. 8 and 9, the aperture stop 110a lifts away from the optical lens 110 and comes to rest over the panel 126. Similar to the movement describe in FIG. 1-5, the optical switching system 100 in the nominal position may also move counterclockwise.

As described above, the cam device included in the optical switching system provides an efficient and elegant solution for switching between multiple optical systems in an imaging device. The shape of the cam device, specifically the beveled edges included in the cam, allow the field of view optics to safely rotate into position while safely moving the focus cell out of the way. Further, the lead screw and the compression spring allow the focus optics to spring back into position, forming the optical path, only when the field of view optic system finishes a rotation. Use of such a mechanical solution, rather than the software based solution used in conventional systems, greatly reduces the overall switching time. In one example, the optical switching system delivers an overall reaction time that is approximately four times faster conventional systems.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical switching system comprising:
a focus cell assembly disposed in a plane;
a rotatable field of view optic system having an axis, configured to rotate around the axis, the axis disposed in parallel to the plane of the focus cell; and
a cam device mounted to the field of view optic system and configured to push the focus cell assembly away from the field of view optic system with each rotation of the field of view optic system,
wherein the cam device includes a plurality of un-truncated portions, wherein the plurality of un-truncated portions push the focus cell assembly away from the field of view optic system during each rotation.

2. An optical switching system comprising:
a focus cell assembly disposed in a plane;
a rotatable field of view optic system having an axis, configured to rotate around the axis, the axis disposed in parallel to the plane of the focus cell;
a cam device mounted to the field of view optic system and configured to push the focus cell assembly away from the field of view optic system with each rotation of the field of view optic system; and
a focus lead screw coupled to the focus cell assembly and configured to return the focus cell assembly toward the field of view optic system after each rotation.

3. The optical switching system of claim 2, wherein the cam device has a truncated circle shape including a plurality of truncations.

4. The optical switching system of claim 2, wherein the field of view optic system includes a plurality of sides and further includes a plurality of optics disposed on the plurality of sides.

5. The optical switching system of claim 4, wherein the plurality of optics includes a first lens cell, a second lens cell, a third lens cell, and a fourth lens cell and the plurality of sides includes four sides.

6. The optical switching system of claim 5, wherein the first lens cell, the second lens cell, the third lens cell and the fourth lens cell are disposed on each of the four sides of the field of view optic system, respectively.

7. The optical switching system of claim 2, further comprising a gear system in contact with the cam device and configured to rotate the field of view optic system.

8. The optical switching system of claim 2, wherein the focus lead screw further includes a helical coil spring wrapped around the length of the focus lead screw.

9. The optical switching system of claim 8, wherein the cam followers are configured to prevent the field of view optic system from colliding with the focus cell assembly.

10. The optical switching system of claim 2, further comprising a focus lead screw nut coupled to the focus lead screw and configured to adjust a distance between the focus cell assembly and the field of view optic system.

11. An optical switching system comprising:
a focus cell assembly disposed in a plane;
a rotatable field of view optic system having an axis, configured to rotate around the axis, the axis disposed in parallel to the plane of the focus cell;
a cam device mounted to the field of view optic system and configured to push the focus cell assembly away from the field of view optic system with each rotation of the field of view optic system; and
at least two cam followers coupled to the focus cell assembly and configured to roll along the cam device.

12. The optical switching system of claim 2, further comprising at least one cam stop disposed on the cam device and configured to stop the cam device from rotating.

13. A method of selecting between one of several available in optic modules in an optical system, the optical system including a field of view optic system disposed around an axis, a cam device coupled to the field of view optic system, and a focus cell assembly disposed perpendicular to the axis, the method comprising:

rotating the field of view optic system around the axis;

pushing the focus cell assembly away from the field of view optic system during each rotation of the field of view optic system;

switching between a plurality of optical states, each rotation corresponding to one of the optical states, wherein the plurality of optical states include a first optical state, a second optical state and a third optical state, and wherein rotating the field of view optic system further comprises rotating the field of view optic system from the first optical state, to the second optical state, to the third optical state; and compressing a helical coil spring as a result of the focus cell assembly being pushed away from the field of view optic system, during each rotation of the field of view optic system.

14. The method of claim 13, wherein the field of view optic system further comprises a plurality of lens cells and wherein switching between the plurality of optical states further comprises aligning one of the plurality of lens cells to the focus cell at each rotation.

15. The method of claim 13, wherein the optical system further comprises a focus lead screw having a length, and wherein the method further comprises returning the focus cell assembly toward the field of view optic system by releasing the helical coil spring.

16. The method of claim 15, wherein the optical system further comprises a focus lead screw nut coupled to the focus lead screw, wherein the method further comprises adjusting a distance between the focus cell assembly and the field of view optic system by moving the focus lead screw nut along the length of the focus lead screw.

17. The method of claim 13, wherein the optical system further comprises a gear system in contact with the cam device, wherein rotating the field of view optic system around the axis comprises rotating the field of view optic system by rotating the gear system.

* * * * *